US012308561B2

(12) United States Patent
Nakano et al.

(10) Patent No.: US 12,308,561 B2
(45) Date of Patent: May 20, 2025

(54) CONNECTOR INCLUDING ABUTTED SECTION FORMING PAIR WITH ABUTTING SECTION OF MATING FITTING SPACE TO ALIGN CENTER OF CONNECTOR WITH CENTER OF MATING FITTING SPACE

(71) Applicant: Yazaki Corporation, Tokyo (JP)

(72) Inventors: Katsuya Nakano, Shizuoka (JP); Takashi Sone, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 367 days.

(21) Appl. No.: 17/955,448

(22) Filed: Sep. 28, 2022

(65) Prior Publication Data

US 2023/0119971 A1 Apr. 20, 2023

(30) Foreign Application Priority Data

Oct. 20, 2021 (JP) ................................. 2021-171274

(51) Int. Cl.

| | |
|---|---|
| ***H01R 13/52*** | (2006.01) |
| ***H01R 13/42*** | (2006.01) |
| ***H01R 13/629*** | (2006.01) |
| ***H01R 13/639*** | (2006.01) |

(52) U.S. Cl.

CPC ......... *H01R 13/5202* (2013.01); *H01R 13/42* (2013.01); *H01R 13/629* (2013.01); *H01R 13/639* (2013.01)

(58) Field of Classification Search

CPC .. H01R 13/5202; H01R 13/42; H01R 13/629; H01R 13/639; H01R 13/4362; H01R 13/4223

See application file for complete search history.

(56) References Cited

U.S. PATENT DOCUMENTS

| | | | | |
|---|---|---|---|---|
| 5,931,699 A * | 8/1999 | Saito | H01R 13/5208 | 439/275 |
| 6,916,202 B2 * | 7/2005 | Maue | H01R 13/5219 | 439/587 |
| 6,994,590 B2 * | 2/2006 | Nishida | H01R 13/5219 | 439/271 |

(Continued)

FOREIGN PATENT DOCUMENTS

| | | |
|---|---|---|
| JP | 2011-34825 A | 2/2011 |
| JP | 2012-114052 A | 6/2012 |
| JP | 2020-202741 A | 12/2020 |

*Primary Examiner* — Thanh Tam T Le

(74) *Attorney, Agent, or Firm* — KENEALY VAIDYA LLP

(57) ABSTRACT

A connector includes a terminal fitting that is connected to a mating terminal fitting of a mating fitting space, a housing that includes a fitting wall fitted into the mating fitting space and a terminal accommodating section that accommodates the terminal fitting and is inserted into the mating fitting space together with the fitting wall, and an annular or tubular elastically deformable sealing member that fills an annular or tubular gap between an outer peripheral surface of the fitting wall and an inner peripheral surface of the mating fitting space in a circumferential direction at a fitting completion position of the fitting wall and the mating fitting space where positions of axial centers of the fitting wall and the mating fitting space are aligned with each other.

7 Claims, 14 Drawing Sheets

(56) References Cited

U.S. PATENT DOCUMENTS

| | | | | |
|---|---|---|---|---|
| 8,038,486 | B1 * | 10/2011 | Nakamura | H01R 13/4362<br>439/752 |
| 8,133,076 | B2 * | 3/2012 | Nakamura | H01R 13/516<br>439/587 |
| 8,215,987 | B2 * | 7/2012 | Yoshioka | H01R 13/4362<br>439/587 |
| 8,403,693 | B2 * | 3/2013 | Uchida | H01R 13/5227<br>439/271 |
| 8,491,323 | B2 * | 7/2013 | Ishibashi | H01R 13/5221<br>439/271 |
| 8,562,377 | B2 * | 10/2013 | Kawamura | H01R 13/5205<br>439/607.44 |
| 8,562,381 | B2 * | 10/2013 | Kawamura | H01R 11/12<br>439/801 |
| 8,602,819 | B2 * | 12/2013 | Uchida | H01R 13/502<br>439/596 |
| 9,106,000 | B2 * | 8/2015 | Mizutani | H01R 13/5219 |
| 9,293,856 | B2 * | 3/2016 | Shigeta | H01R 13/5202 |
| 9,379,483 | B2 * | 6/2016 | Suzuki | H01R 13/629 |
| 9,711,915 | B2 * | 7/2017 | Hiramatsu | H01R 13/4364 |
| 9,787,018 | B2 * | 10/2017 | Chonan | H01R 13/5202 |
| 9,793,644 | B2 * | 10/2017 | Fujii | H01R 13/6594 |
| 9,991,625 | B2 * | 6/2018 | Ozaki | H01R 13/5202 |
| 10,062,974 | B2 * | 8/2018 | Okamoto | H01R 4/34 |
| 10,498,072 | B2 * | 12/2019 | Hashimoto | H01R 13/5219 |
| 10,511,119 | B2 * | 12/2019 | Makino | H01R 13/5202 |
| 11,545,782 | B2 * | 1/2023 | Okayasu | H01R 13/6596 |
| 11,677,177 | B2 * | 6/2023 | Aoshima | H01R 13/5205<br>439/587 |
| 2012/0040553 | A1 | 2/2012 | Tashiro | |
| 2020/0389039 | A1 | 12/2020 | Daily et al. | |

* cited by examiner

CONNECTOR INCLUDING ABUTTED SECTION FORMING PAIR WITH ABUTTING SECTION OF MATING FITTING SPACE TO ALIGN CENTER OF CONNECTOR WITH CENTER OF MATING FITTING SPACE

CROSS-REFERENCE TO RELATED APPLICATION(S)

The present application claims priority to and incorporates by reference the entire contents of Japanese Patent Application No. 2021-171274 filed in Japan on Oct. 20, 2021.

BACKGROUND OF THE INVENTION

1. Field of the Invention

The present invention relates to a connector.

2. Description of the Related Art

In a connector, in a case where a terminal fitting is not placed at a predetermined position in design with respect to a mating terminal fitting, there is a possibility that a quality in electrical connection between the terminal fitting and the mating terminal fitting cannot be ensured or an overload is generated between a component and a mating component thereof, Therefore, in a connector according to the related art, a physical positional relationship between the terminal fitting and the mating terminal fitting may be adjustable. For example, Japanese Patent Application Laid-open No. 2011-34825 discloses a connector having a function of aligning a terminal fitting by accommodating the terminal fitting in such a way that the terminal fitting is relatively movable with respect to a housing.

However, in the connector according to the related art, in a case where axial center misalignment occurs between a housing and a mating fitting portion to which the housing is to be fitted, even when the terminal fitting can be aligned with respect to the housing, there is a possibility that the terminal fitting cannot be appropriately aligned with respect to the mating terminal fitting.

SUMMARY OF THE INVENTION

Therefore, an object of the present invention is to provide a connector capable of appropriately aligning a terminal fitting.

To achieve the above object, a connector according to one aspect of the present invention includes a terminal fitting that is physically and electrically connected to a mating terminal fitting arranged in a mating fitting space; a housing that includes a fitting wall fitted into the mating fitting space through an insertion port in a housing insertion direction, and a terminal accommodating section that accommodates the terminal fitting in a terminal accommodating chamber in the terminal accommodating section and is inserted into the mating fitting space together with the fitting wall; and an annular or tubular elastically deformable sealing member that fills an annular or tubular gap between an outer peripheral surface of the fitting wall and an inner peripheral surface of the mating fitting space in a circumferential direction at a fitting completion position of the fitting wall and the mating fitting space where positions of axial centers of the fitting wall and the mating fitting space are aligned with each other, wherein the housing includes an abutted section that abuts on an abutting section on a side of the inner peripheral surface of the mating fitting space at the fitting completion position, and the abutted section is provided at each of at least three locations together with the abutting section that forms a pair with the abutted section, and is formed in such a way that a distance from the axial center of the fitting wall to a contact position between the abutted section and the abutting section is the same as a distance from the axial center of the mating fitting space to the contact position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a connector according to the present invention will be described in detail with reference to the drawings. Note that the present invention is not limited by the embodiment.

EMBODIMENT

One embodiment of a connector according to the present invention will be described with reference to FIGS. 1 to 16.

Reference Sign 1 in FIGS. 1 to 10 denotes a connector according to the present embodiment. The connector 1 is attached to an end of an electric wire We, and is electrically connected to a device (not illustrated) on the other side of the electric wire We. Then, the connector 1 is electrically connected to a mating terminal fitting 510 (FIGS. 3 and 4) of a mating device 500 to electrically connect the mating device 500 and the device on the other side of the electric wire We. The mating terminal fitting 510 is arranged in a mating fitting space 500*b* of a casing 500*a* of the mating device 500 and is electrically connected to the connector 1 fitted in the mating fitting space 500*b*. For example, here, the device on the other side of the electric wire We is an inverter of a vehicle, and the mating device 500 is a rotary machine of the vehicle.

Figure 6:
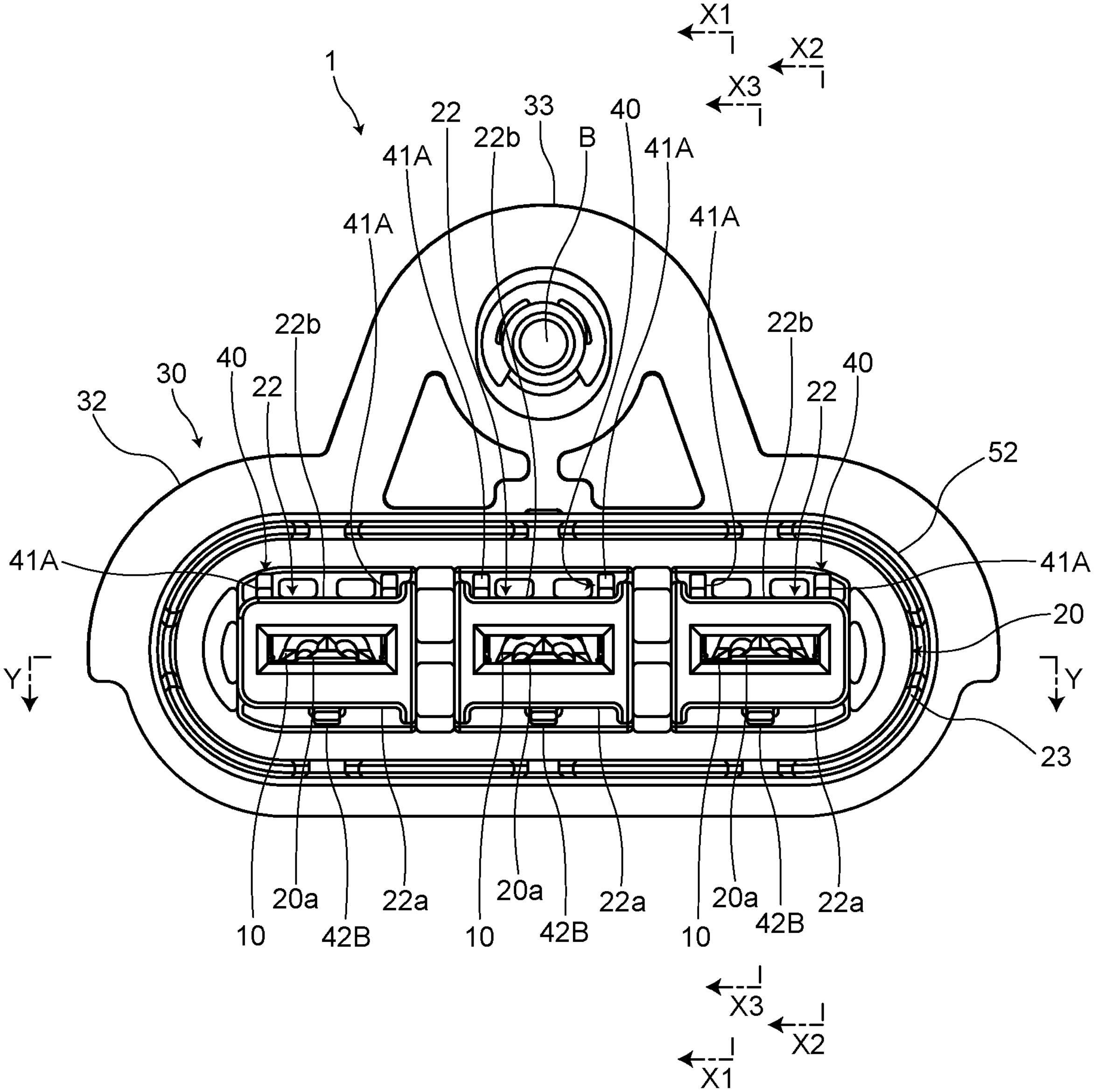
FIG. 6 is a plan view of the connector according to the embodiment as viewed from a terminal accommodating section side.
Figure 7:
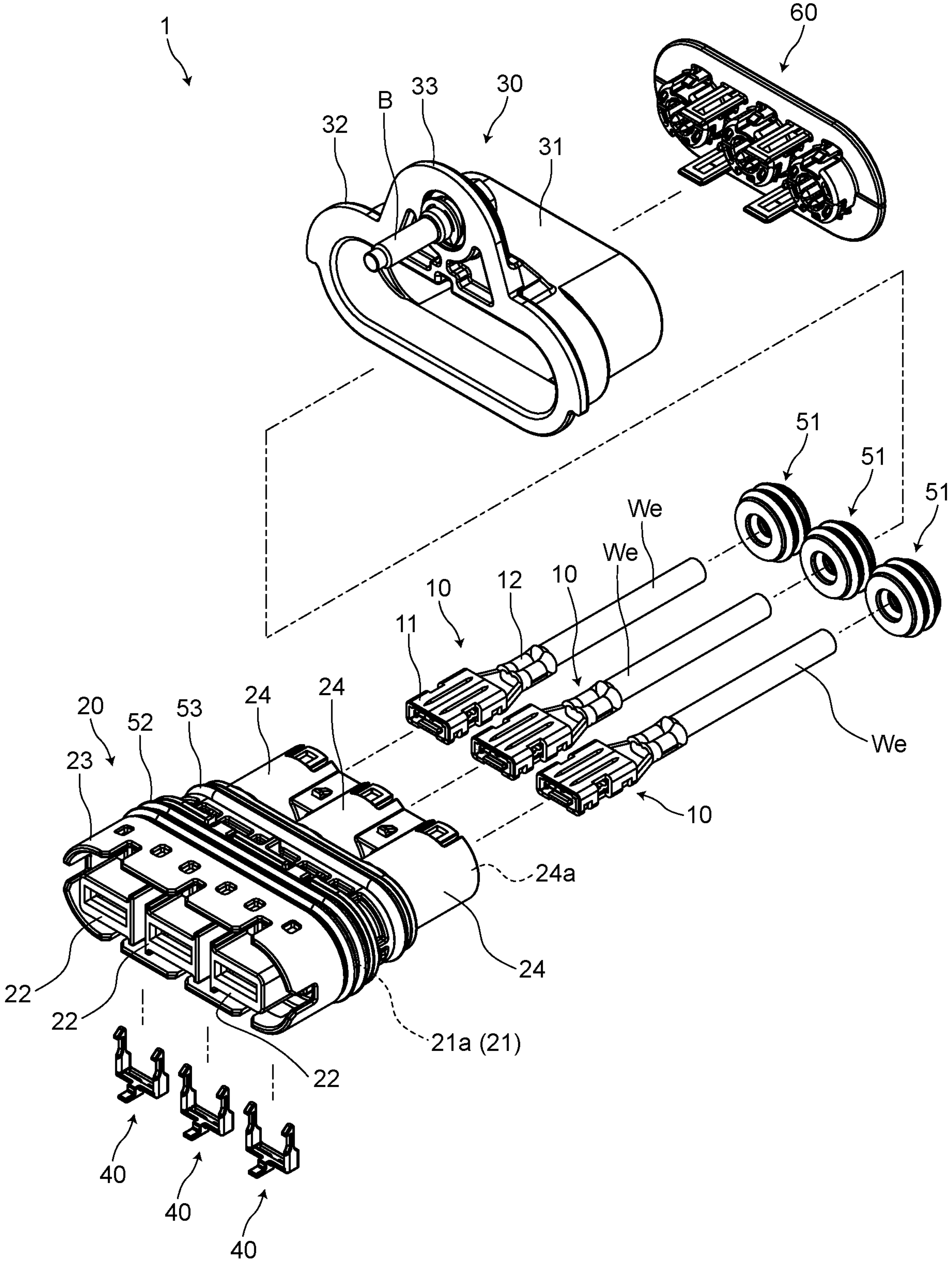
FIG. 7 is an exploded perspective view illustrating the connector according to the embodiment.

The connector 1 includes a terminal fitting 10, a housing 20, a shield shell 30, and a retaining member 40 (FIGS. 6 and 7).

The terminal fitting 10 is formed of a conductive material such as a metal. For example, the terminal fitting 10 is formed in a predetermined shape by press molding such as bending or cutting of a metal plate as a base material. The terminal fitting 10 is attached to the end of the electric wire We in such a way as to be electrically connected to the electric wire We. Further, the terminal fitting 10 is physically and electrically connected to the mating terminal fitting 510 arranged in the mating fitting space 500*b*. Therefore, the terminal fitting 10 includes a terminal connection section 11 physically and electrically connected to the mating terminal fitting 510 and an electric wire connection section 12 physically and electrically connected to the end of the electric wire We (FIG. 7).

For example, the terminal connection section 11 may be fitted and connected to the mating terminal connection section 511 of the mating terminal fitting 510, or may be screwed and fixed to the mating terminal connection section 511. The terminal connection section 11 according to the present embodiment is formed to be fitted and connected to the mating terminal connection section 511. Therefore, one of the terminal connection section 11 and the mating terminal connection section 511 is formed in a female terminal shape, and the other is formed in a male terminal shape.

Figure 1:
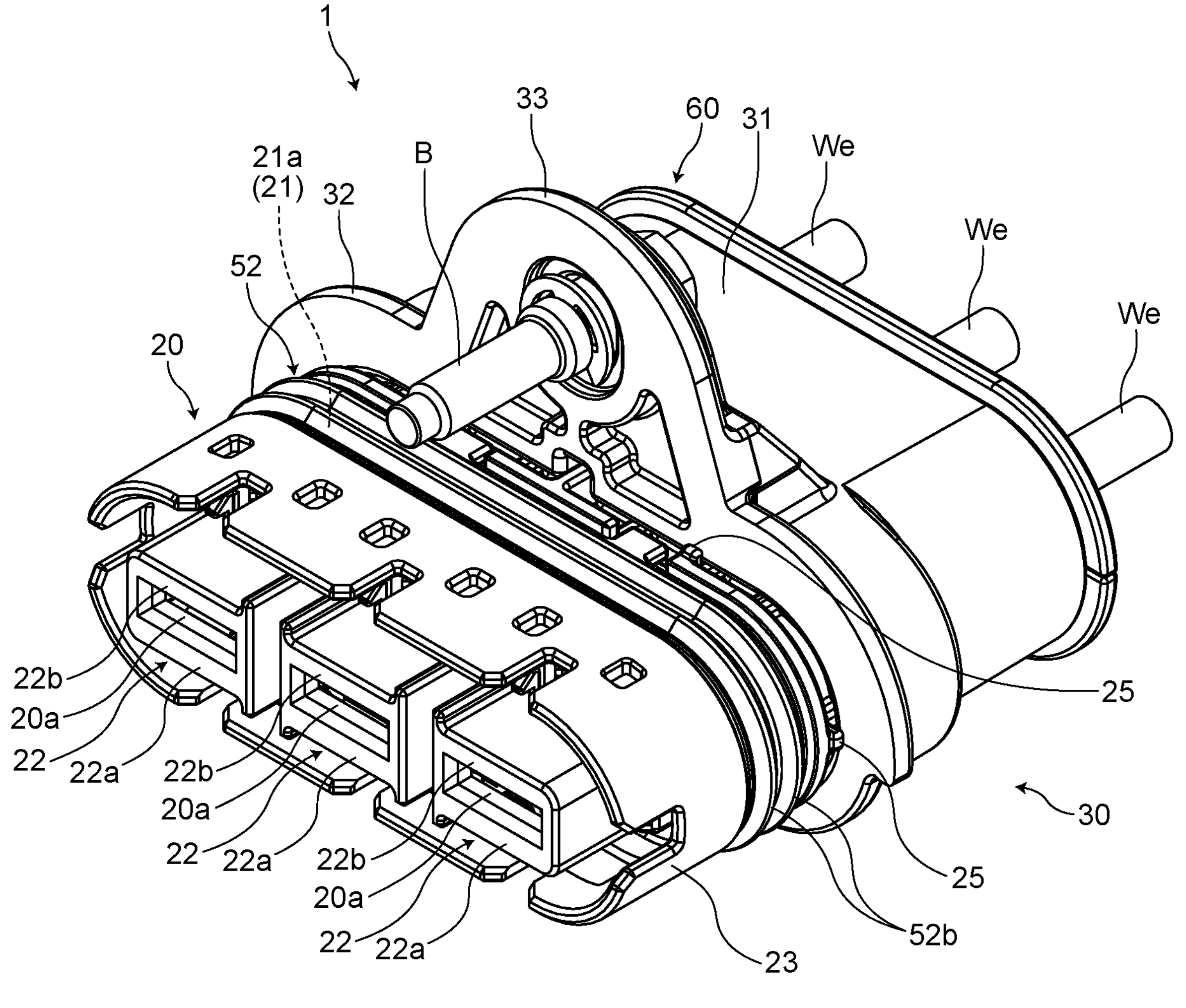
FIG. 1 is a perspective view illustrating a connector according to an embodiment.
Figure 2:
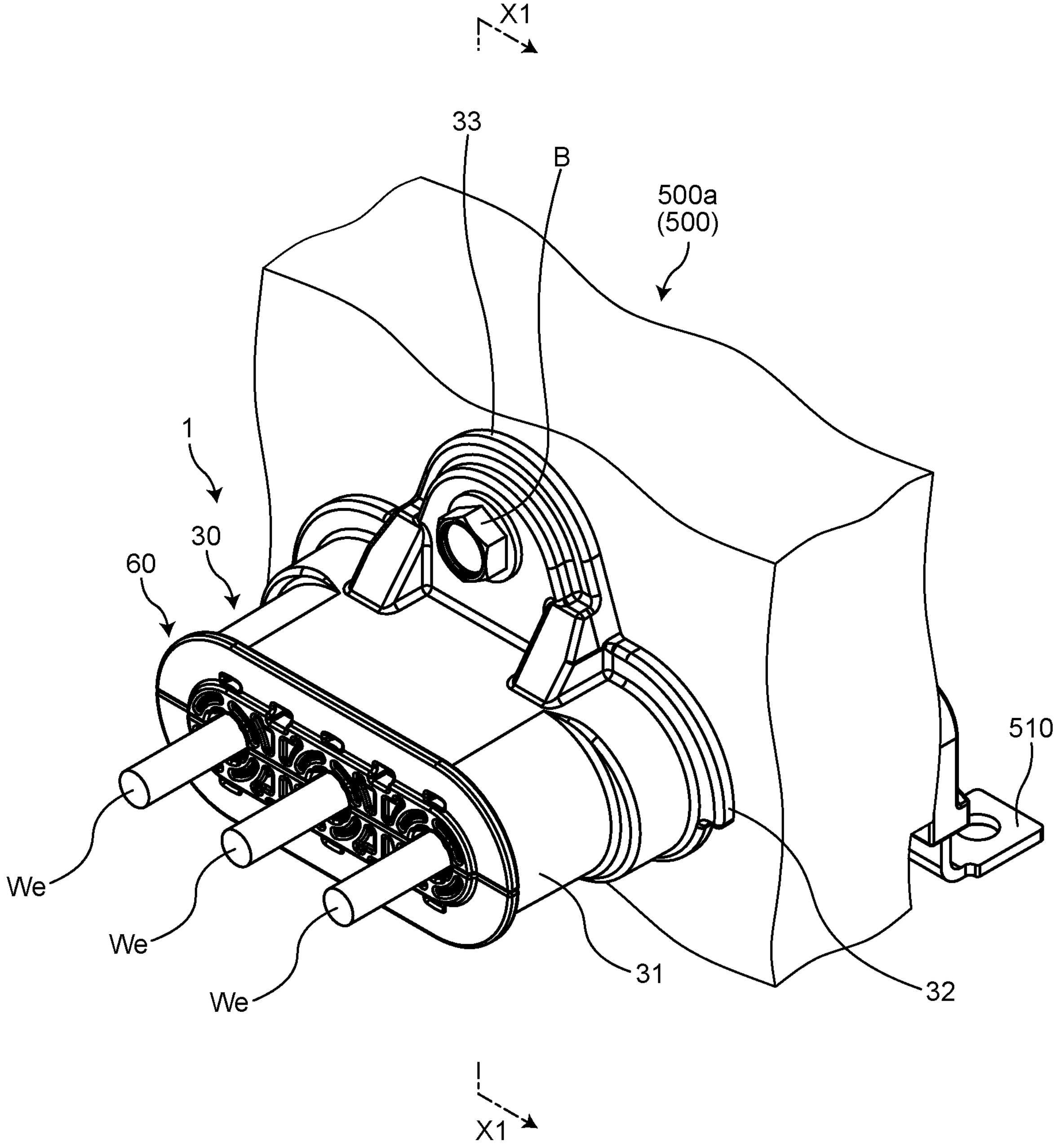
FIG. 2 is a perspective view of the connector according to the embodiment as viewed from another angle together with a mating connector, and illustrates the connectors after fitting connection.
Figure 3:
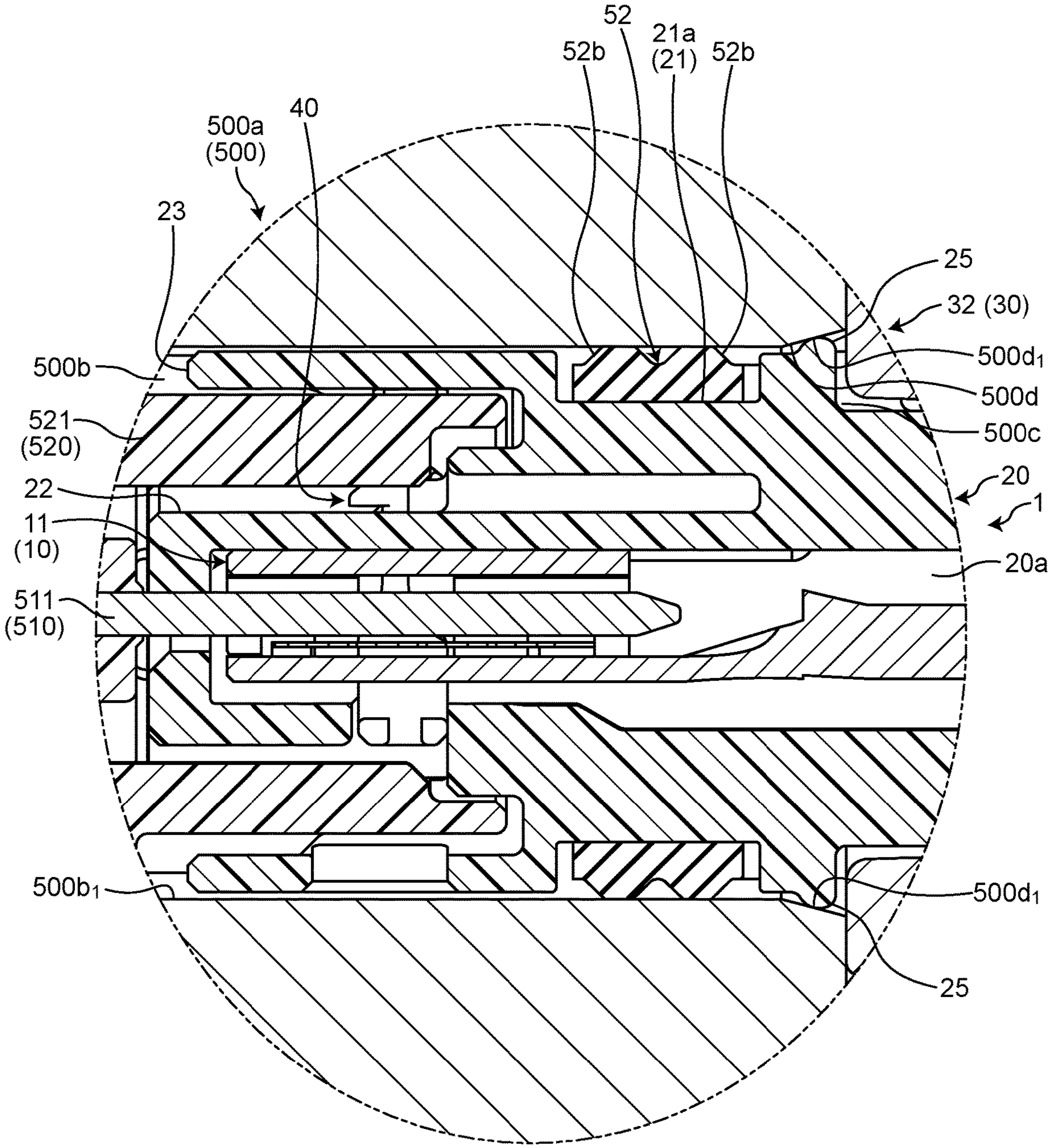
FIG. 3 is a partially enlarged view of a cross section taken along line X1-X1 of FIG. 2.
Figure 4:
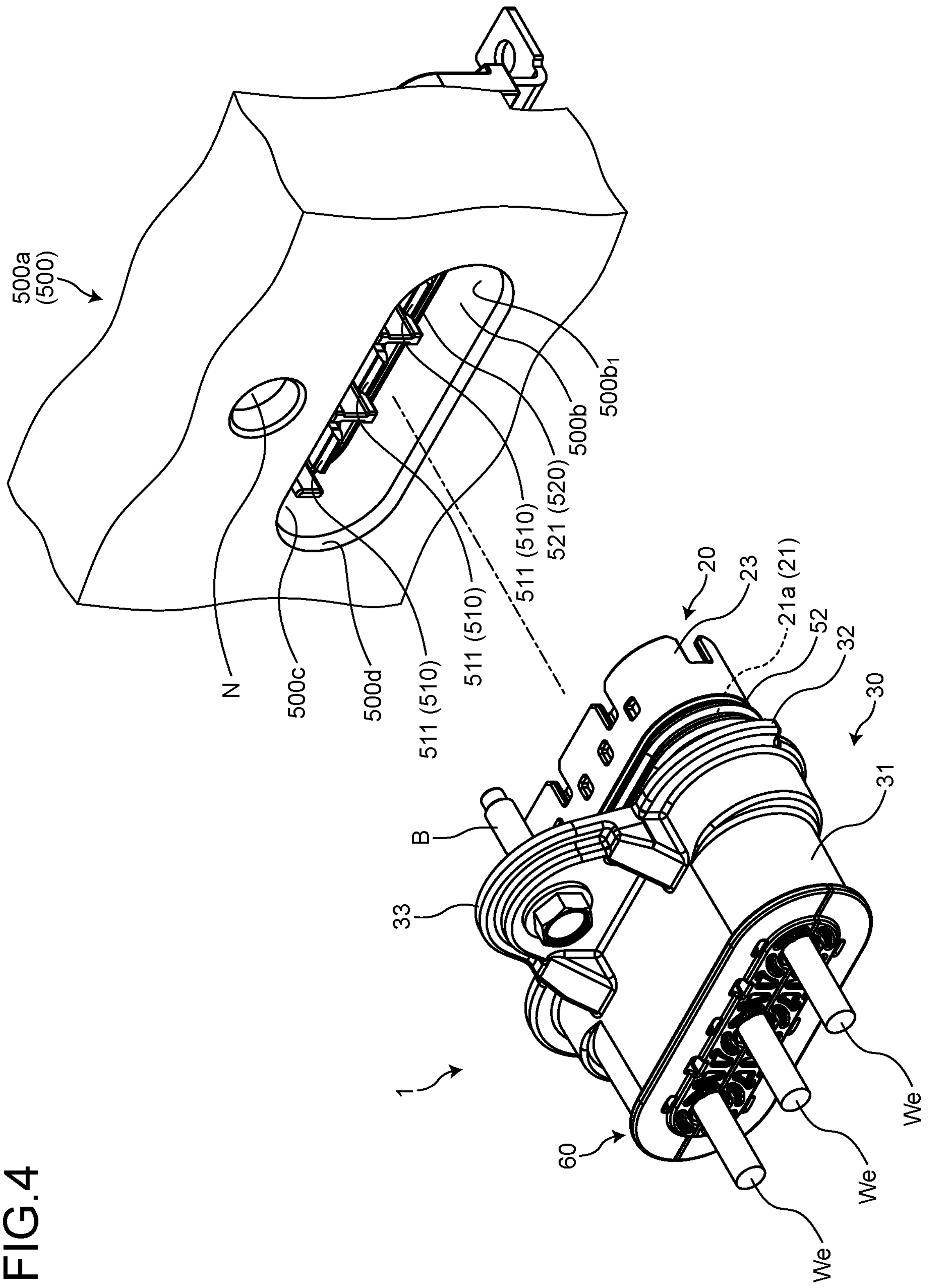
FIG. 4 is a perspective view of the connector according to the embodiment as viewed from another angle together with the mating connector, and illustrates the connectors before fitting connection.

The terminal connection section 11 illustrated here is formed in a tubular female terminal shape, and the mating terminal connection section 511 is inserted into the terminal connection section 11 (FIG. 3). As the housing 20 of the connector 1 is fitted into the mating fitting space 500*b* in a housing insertion direction, the mating terminal connection section 511 is inserted into the terminal connection section 11 in a direction opposite to the housing insertion direction. The terminal connection section 11 is formed in, for example, a rectangular tubular shape or a cylindrical shape. Here, the terminal connection section 11 is formed in a rectangular tubular Shape (FIG. 7). The mating terminal connection section 511 illustrated here is formed in a piece-like male terminal shape (so-called male tab shape) (FIGS. 3 and 4).

Figure 10:
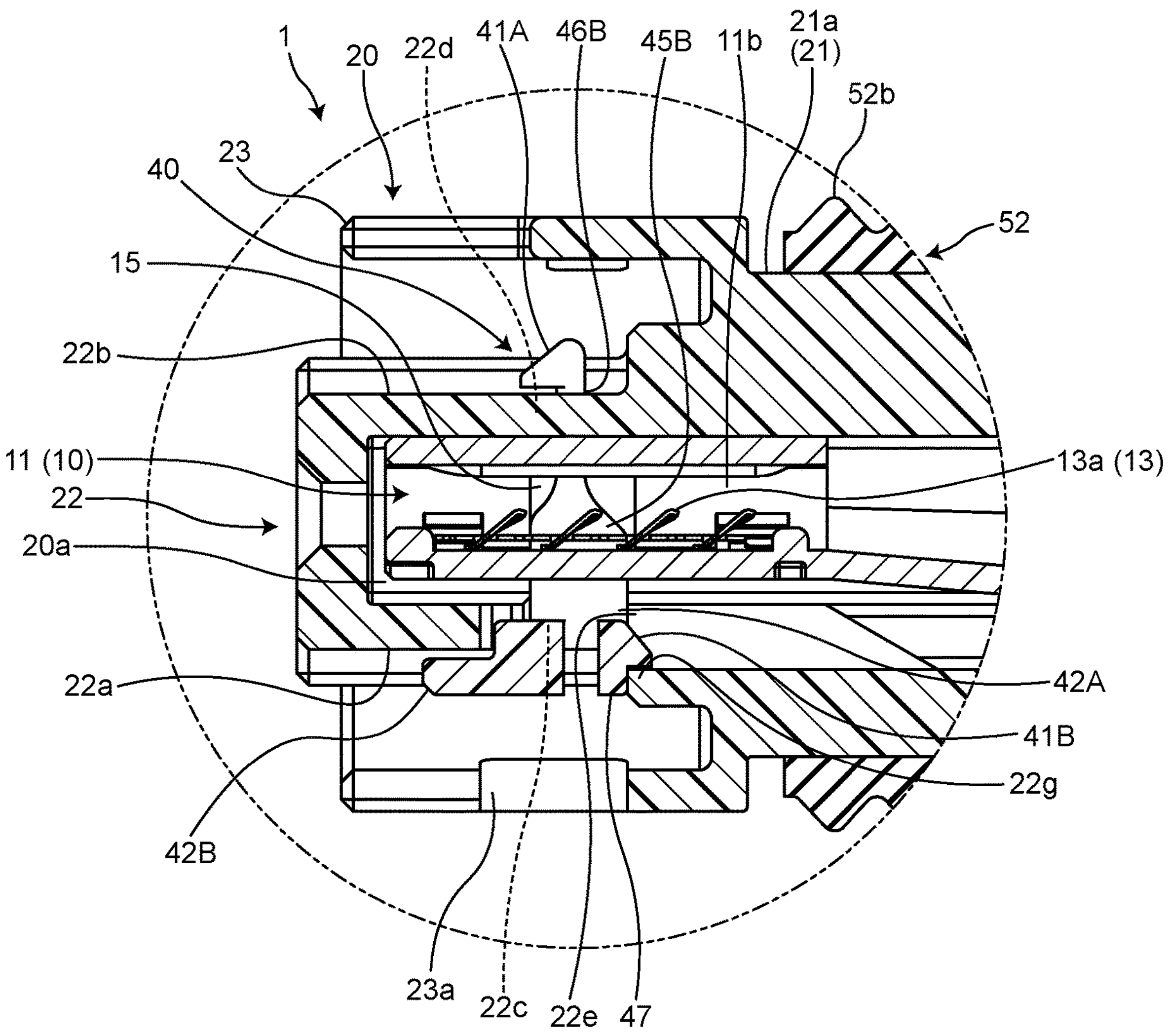
FIG. 10 is a partially enlarged view of a cross section taken along line X3-X3 of FIG. 6.

Further, an integrated or separate elastic contact section 13*a* is provided in the terminal connection section 11 illustrated here (FIG. 10). The elastic contact section 13*a* is a section that ensures a contact pressure between a contact point and the mating terminal connection section 511 by a resilient force accompanying elastic deformation. Here, a contact member 13 separate from the terminal fitting 10 includes the elastic contact section 13*a*. In the connector 1, the elastic contact section 13*a* is arranged inside the terminal connection section 11 by mounting the contact member 13 inside the terminal connection section 11. The elastic contact section 13*a* comes into contact with one plane of the piece-like mating terminal connection section 511, and applies a resilient force in, for example, an orthogonal direction to the plane.

The electric wire connection section 12 is physically and electrically connected to the electric wire We by, for example, being crimped or welded to a core wire of the end of the electric wire We. The electric wire connection section 12 illustrated here is crimped to the core wire by caulking and connecting two barrel pieces to the bare core wire.

The terminal fitting 10 in this example is formed as a straight terminal fitting in which the terminal connection section 11 and the electric wire connection section 12 are arranged on a straight line. Therefore, the electric wire We is led out from the electric wire connection section 12 in an extending direction of the terminal fitting 10 along the straight line. However, in the terminal fitting 10, the terminal connection section 11 and the electric wire connection section 12 may be arranged in such a way as to intersect each other, for example, by orthogonally arranging the terminal connection section 11 and the electric wire connection section 12.

The connector 1 illustrated here includes three pairs of combinations of the terminal fittings 10 and the electric wires We.

The housing 20 is formed of an insulating material such as a synthetic resin. The housing 20 accommodates the terminal fitting 10 and the electric wire We at the accommodation completion position inside of the housing 20. Then, in the housing 20, the terminal fitting 10 is held in an accommodated state at the accommodation completion position, and the electric wire We is led out from the inside to the outside.

Figure 5:
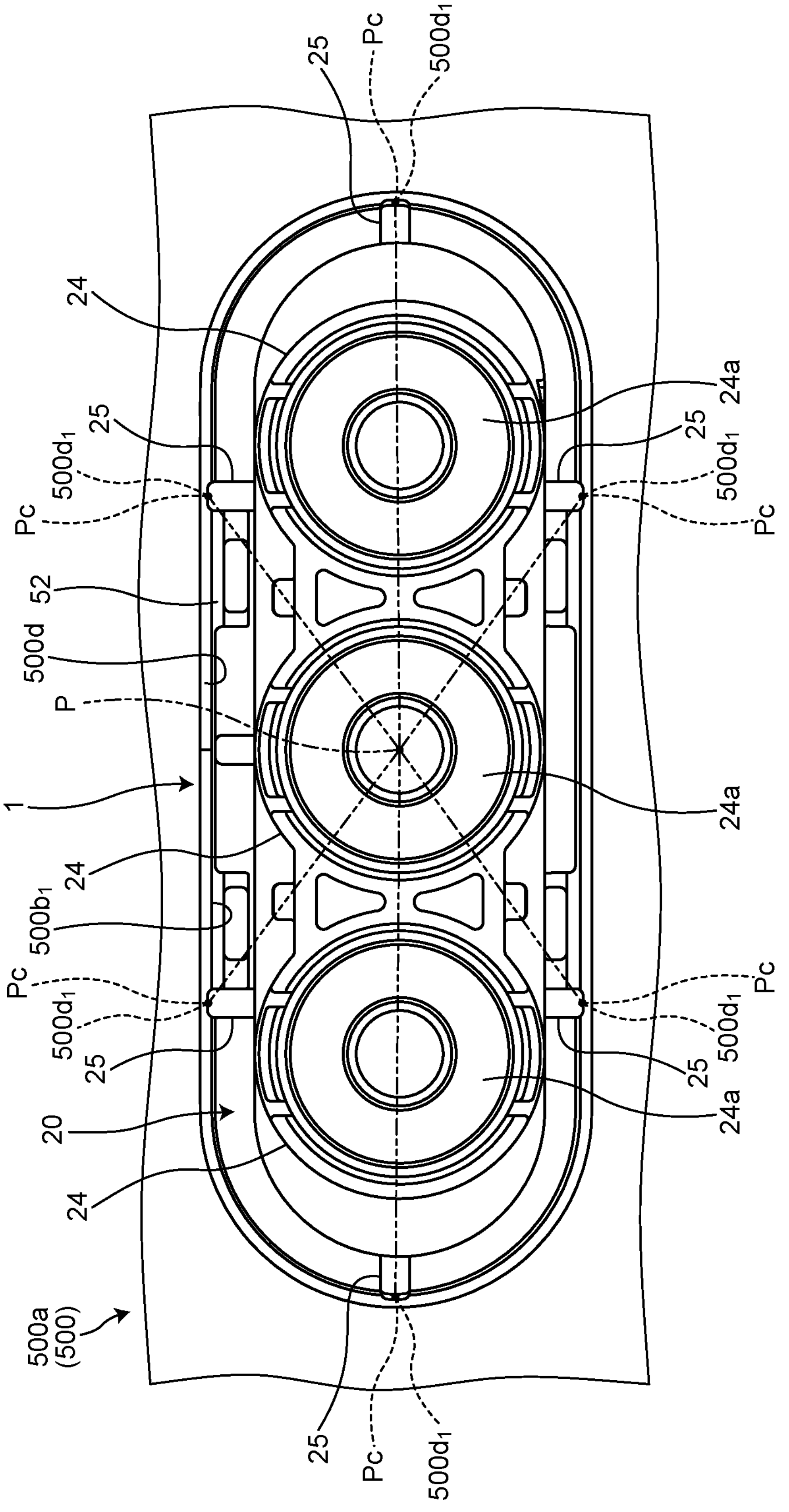
FIG. 5 is a plan view of the connector according to the embodiment when viewed from an electric wire outlet side, in which a housing and a second sealing member are cut away.

The housing 20 includes a fitting wall 21 fitted into the mating fitting space 500*b* through an insertion port 500*c* in the housing insertion direction (FIGS. 3 and 4). The fitting wall 21 and the mating fitting space 500*b* are formed in such a way that an outer peripheral surface 21*a* of the fitting wall 21 and an inner peripheral surface 500*b*1 of the mating fitting space 500*b* have similar cross-sectional shapes orthogonal to the housing insertion direction with the same axial center P (FIG. 5). Then, in the connector 1, the fitting wall 21 and the mating fitting space 500*b* are fitted by aligning the positions of the axial centers P. The mating fitting space 500*b* illustrated here is formed as an oval through-hole. Therefore, the fitting wall 21 illustrated here is formed to have an oval outer peripheral surface 21*a* having a shape similar to the mating fitting space 500*b*.

In addition, the housing 20 includes a terminal accommodating section 22 that accommodates the terminal fitting 10 in a terminal accommodating chamber 20*a* in the terminal accommodating section 22 (FIGS. 1, 3, and 6 to 10). The terminal fitting 10 is inserted into the terminal accommodating chamber 20*a* through an electric wire outlet 24*a* described later in a terminal insertion direction that is the same as the housing insertion direction. The terminal accommodating section 22 protrudes from the fitting wall 21 in the housing insertion direction, and is inserted into the mating fitting space 500*b* through the insertion port 500*c* together with the fitting wall 21.

Figure 8:
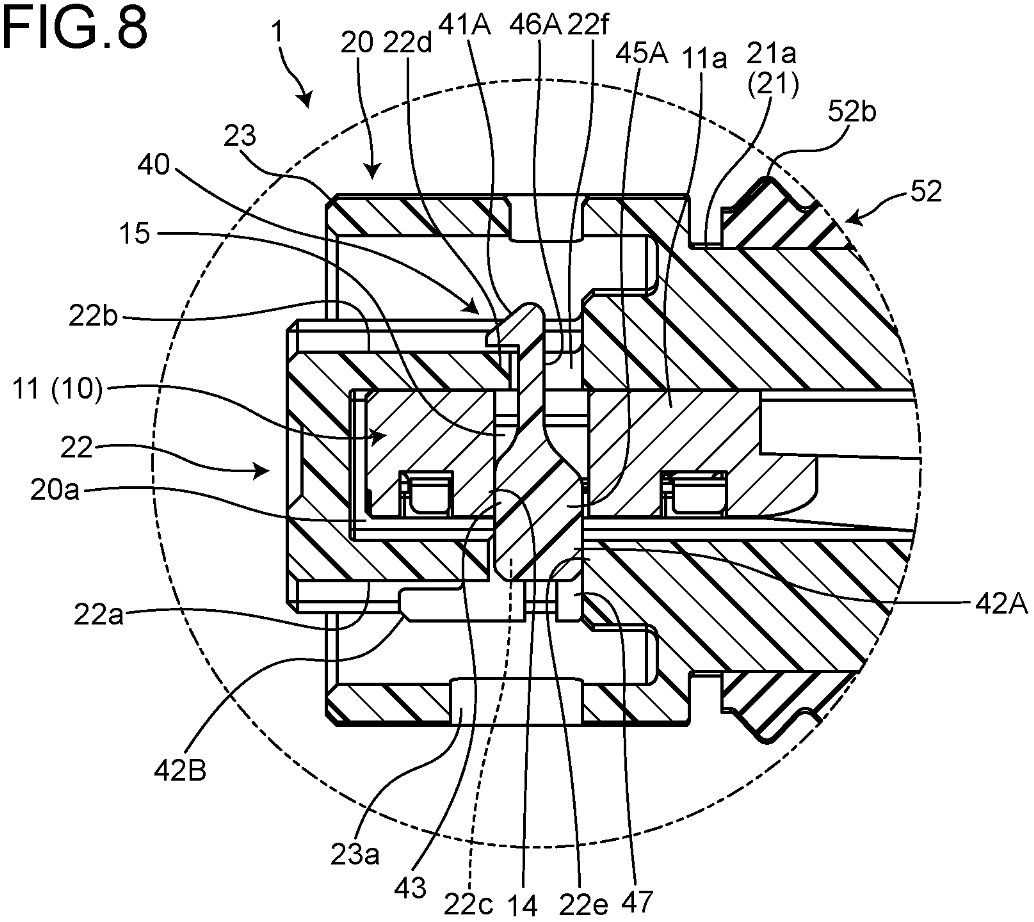
FIG. 8 is a partially enlarged view of a cross section taken along line X2-X2 of FIG. 6.

In the connector 1, in order to generate the contact pressure between the contact point and the mating terminal connection section 511 accompanying the elastic deformation of the elastic contact section 13*a* without excess or deficiency, the terminal fitting 10 is accommodated in the terminal accommodating chamber 20*a* in such a way as to be relatively movable with respect to the mating terminal connection section 511 in a contact pressure acting direction. That is, the connector 1 has a function of aligning the terminal fitting 10 in the contact pressure acting direction. Therefore, the terminal accommodating chamber 20*a* is formed in an indoor space in which the terminal fitting 10 can relatively move in an alignment direction orthogonal to the terminal insertion direction. Therefore, the terminal accommodating chamber 20*a* is formed in such a way that the terminal fitting 10 can be arranged while being spaced apart from each of a first wall body 22*a* and a second wall body 22*b* of the terminal accommodating section 22 (FIGS. 8 and 10).

The first wall body 22*a* and the second wall body 22*b* are wall bodies forming the terminal accommodating chamber 20*a* in the terminal accommodating section 22, and are arranged to face each other while being spaced apart from each other in the alignment direction. In addition, in the terminal accommodating chamber 20*a*, the size of the gap between the first wall body 22*a* and the terminal fitting 10 and the size of the gap between the second wall body 22*b* and the terminal fitting 10 are set in such a way that a relative movement amount of the terminal fitting 10 with respect to the mating terminal connection section 511 that can generate a contact pressure between the contact point of the elastic contact section 13*a* and the mating terminal connection section 511 without excess or deficiency can be secured.

The terminal accommodating section 22 illustrated here is formed in a rectangular tubular shape, and the rectangular tubular terminal connection section 11 is accommodated in the terminal accommodating chamber 20*a* inside the terminal accommodating section 22. In the terminal accommodating section 22 illustrated here, one of two pairs of wall bodies arranged to face each other while being spaced apart from each other is the first wall body 22*a* and the second wall body 22*b*. In the terminal accommodating chamber 20*a*, one wall body of the terminal connection section 11 is arranged to face the first wall body 22*a*, and another wall body of the terminal connection section 11 arranged to face the one wall body of the terminal connection section 11 while being spaced apart from the one wall body is arranged to face the second wall body 22*b*. Further, in the terminal accommodating section 22 illustrated here, the mating terminal connection section 511 is inserted into the terminal accommodating chamber 20*a* through one opening in the tube axis direction, and the mating terminal connection section 511 is inserted into the terminal connection section 11 in the terminal accommodating chamber 20*a*.

The housing 20 includes the terminal accommodating section 22 for each terminal fitting 10. In the housing 20, the respective terminal accommodating sections 22 are arranged at an interval in a direction orthogonal to the terminal insertion direction and the alignment direction. The housing 20 includes a cylindrical hood section 23 that is arranged more toward the housing insertion direction than the fitting wall 21 is and covers a protruding portion of each terminal accommodating section 22 from the fitting wall 21 from the outside while being spaced apart from the protruding portion (FIGS. 1, 3, and 6 to 11). The hood section 23 illustrated here is formed in an oval cylindrical shape having an oval outer peripheral surface similar in shape to the mating fitting space 500*b*. In the housing 20, an oval cylindrical mating terminal accommodating section 521 (FIGS. 3 and 4) of a mating housing 520 is fitted into an oval annular gap between the hood section 23 and each terminal accommodating section 22, and at the same time, each mating terminal connection section 511 inside the mating terminal accommodating section 521 is inserted into each terminal accommodating chamber 20*a*. The mating housing 520 is fixed to the casing 500*a* of the mating device 500 and is arranged in the mating fitting space 500*b* of the casing 500*a* (FIGS. 3 and 4).

Figure 11:
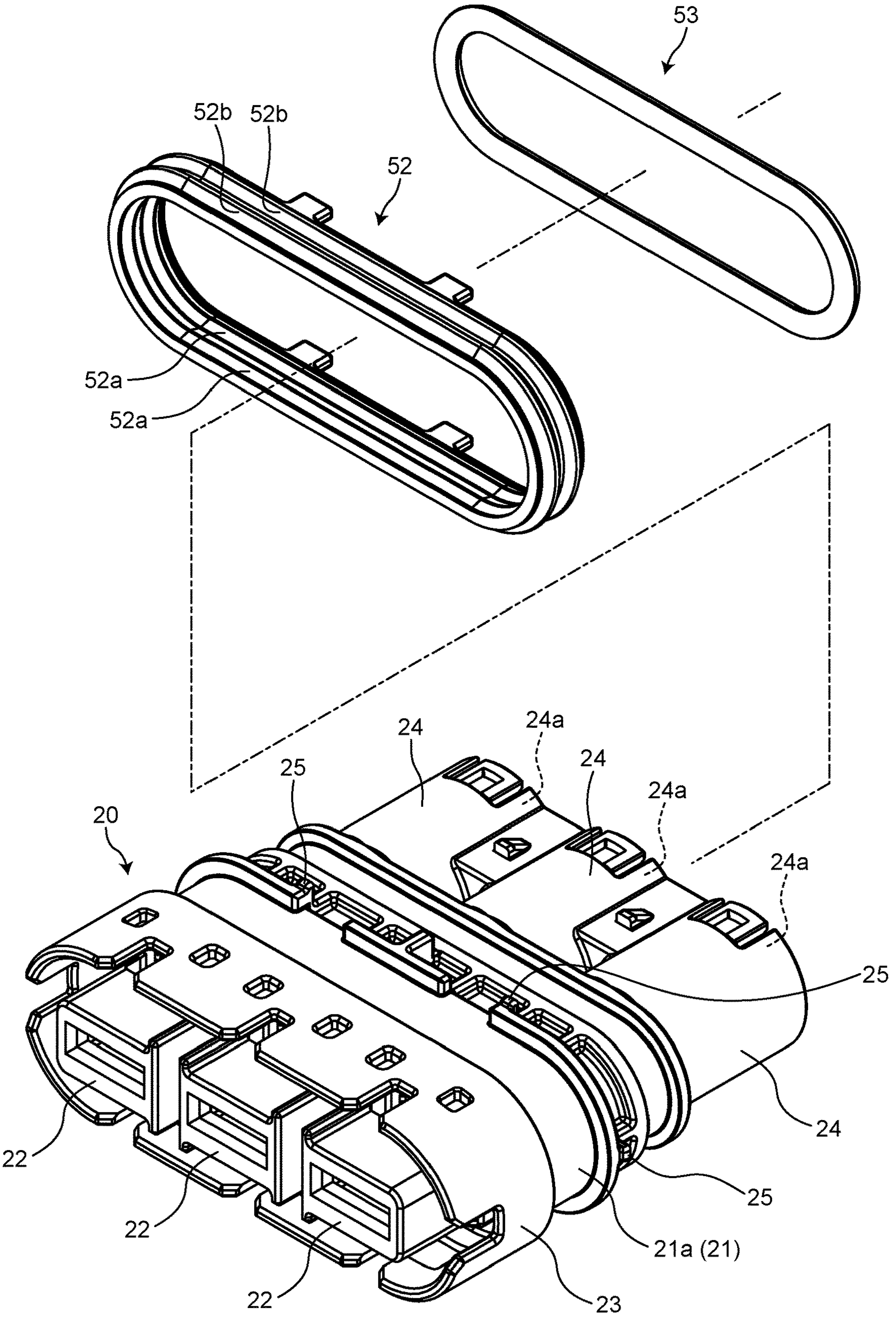
FIG. 11 is an exploded perspective view of the housing and the second sealing member.

In the housing 20, a cylindrical electric wire accommodating section 24 in which the electric wire We is accommodated and from which the electric wire We is led out is provided for each electric wire We (FIGS. 7 and 11). A cylindrical sealing member (hereinafter, referred to as a "first sealing member") 51 that fills a part of a cylindrical gap between an inner peripheral surface of the electric wire accommodating section 24 and an outer peripheral surface of the electric wire We is mounted in the electric wire accommodating section 24 (FIG. 7). The terminal fitting 10 attached to the end of the electric wire We is inserted from the electric wire outlet 24*a* (FIGS. 7 and 11) of the electric wire accommodating section 24 to the terminal accommodating chamber 20*a*. The connector 1 includes a rear holder 60 fitted into a gap between the electric wire outlet 24*a* of each electric wire accommodating section 24 and the electric wire We (FIGS. 1, 2, 4, and 7).

Then, in the connector 1 illustrated here, the hood section 23 has an outer peripheral surface having a similar shape larger than the outer peripheral surface 21*a* of the fitting wall 21. The connector 1 includes an annular or tubular elastically deformable sealing member (hereinafter, referred to as a "second sealing member") 52 that fills an annular or tubular gap between the outer peripheral surface 21*a* of the fitting wall 21 and an inner peripheral surface 500*b*1 of the mating fitting space 500*b* in a circumferential direction at a fitting completion position of the fitting wall 21 and the mating fitting space 500*b* where the positions of the axial centers P are aligned (FIGS. 1, 3 to 8, 10, and 11). The second sealing member 52 is a waterproof member including a plurality of annular lips (hereinafter, referred to as "inner peripheral lips") 52*a* on an inner peripheral surface side and a plurality of annular lips (hereinafter, referred to as "outer peripheral lips") 52*b* on an outer peripheral surface side (FIG. 11). The second sealing member 52 is formed in an oval annular shape or an oval cylindrical shape similar to that of the mating fitting space 500*b*. The second sealing member 52 illustrated here is formed in an oval cylindrical shape similar to the mating fitting space 500*b*, and is mounted on the outer peripheral surface 21*a* of the fitting wall 21.

In the second sealing member 52, the inner peripheral lip 52*a* is brought into close contact with the outer peripheral surface 21*a* of the fitting wall 21 in a state of being crushed in an oval shape similar to that of the outer peripheral surface 21*a* of the fitting wall 21. Then, in the second sealing member 52, the outer peripheral lip 52*b* is brought into close contact with the inner peripheral surface 500*bi* of the mating fitting space 500*b* in a state of being crushed in an oval shape similar to that of the inner peripheral surface 500*bi* of the mating fitting space 500*b* at the fitting completion position. Accordingly, the second sealing member 52 can exert an equal waterproof effect at each position in the circumferential direction. Further, since the second sealing member 52 can align the positions of the respective axial centers P of the fitting wall 21 and the mating fitting space 500*b*, the terminal connection section 11 of the terminal fitting 10 can be appropriately aligned with respect to the mating terminal connection section 511 of the mating terminal fitting 510.

However, in the connector 1, a tolerance is set for each component, and positional deviation between the components within the tolerance is allowed. Therefore, in the connector 1, the crush amount of the inner peripheral lip 52*a* or the outer peripheral lip 52*b* at the fitting completion position at each position in the circumferential direction varies, and the position of the axial center P of the fitting wall 21 may deviate from the position of the axial center P of the mating fitting space 500*b*. That is, in this state, there is a possibility that the connector 1 deteriorates the function of aligning the terminal fitting 10. Therefore, in the connector 1, the housing 20 is formed as follows to suppress deterioration of the function of aligning the terminal fitting 10.

The housing 20 includes an abutted section 25 that abuts on an abutting section 500*di* on the inner peripheral surface 500*bi* side of the mating fitting space 500*b* at the fitting completion position (FIGS. 1, 3, 5, and 11). The abutted section 25 is provided at each of at least three locations together with the abutting section 500*di* that forms a pair with the abutted section 25. The abutted section 25 protrudes higher than the outer peripheral surface 21*a* of the fitting wall 21. The abutted section 25 is formed in such a way that a distance from the axial center P of the fitting wall 21 to a contact position Pc between the abutted section 25 and the abutting section 500*di* and a distance from the axial center P of the mating fitting space 500*b* to the contact position Pc are the same (FIG. 5). As a result, the connector 1 can align the position of the axial center P of the fitting wall 21 with the position of the axial center P of the mating fitting space 500*b* at the fitting completion position. Accordingly, since the connector 1 can suppress the positional deviation of the housing 20 with respect to the inner peripheral surface 500*bi* of the mating fitting space 500*b* at the fitting completion position, the terminal fitting 10 can be appropriately aligned. Furthermore, in the connector 1, since it is possible to suppress variation in crush amount of the inner peripheral lip 52*a* or the outer peripheral lip 52*b* at the fitting completion position, at each position in the circumferential direction, the second sealing member 52 can exert an equal waterproof effect at each position in the circumferential direction.

The abutting section 500*di* illustrated here is provided on an annular tapered surface 500*d* at a peripheral edge of the insertion port 500*c* of the mating fitting space 500*b* (FIGS. 3 to 5). The tapered surface 500*d* is an inclined surface approaching the axial center P of the mating fitting space 500*b* from the insertion port 500*c* toward the housing insertion direction. Therefore, the abutted section 25 illustrated here protrudes higher than the outer peripheral surface 21*a* of the fitting wall 21 on the electric wire accommodating section 24 side of the fitting wall 21, and abuts on the abutting section 500*di* of the tapered surface 500*d* at the fitting completion position. The combination of the abutted section 25 and the abutting section 500*di* illustrated here is provided at each of six locations in the circumferential direction of the outer peripheral surface 21*a* of the fitting wall 21 and the tapered surface 500*d* (FIG. 5).

The shield shell 30 covers each electric wire accommodating section 24 from the outside, thereby suppressing intrusion of noise from the outside into the electric wire We in the electric wire accommodating section 24. Therefore, the shield shell 30 is formed of a metal material (for example, aluminum or an aluminum alloy).

The shield shell 30 includes an oval cylindrical section 31 that covers each electric wire accommodating section 24 from the outside (FIGS. 1, 2, 4, and 7). In the housing 20, an oval annular sealing member (hereinafter, referred to as a "third sealing member") 53 is mounted on an oval outer peripheral surface that is more adjacent to the electric wire accommodating section 24 than the fitting wall 21 and the abutted section 25 are (FIGS. 7 and 11). The third sealing member 53 is a waterproof member that fills a part of an oval cylindrical gap between the oval outer peripheral surface of the housing 20 and an inner peripheral surface of the cylindrical section 31 of the shield shell 30.

An oval annular flange section 32 is connected to the cylindrical section 31 (FIGS. 1, 2, 4, 6, and 7). In the shield shell 30, a fixing section 33 protruding from the flange section 32 is screwed and fixed to a female screw section N of the casing 500*a* of the mating device 500 with a male screw member B (FIG. 4).

The retaining member 40 is formed of an insulating material such as a synthetic resin. The retaining member 40 is mounted on the terminal accommodating section 22. The retaining member 40 suppresses positional deviation of the terminal fitting 10 toward the electric wire outlet 24*a* and prevents the terminal fitting 10 from coming off from the electric wire outlet 24*a* at a mounting completion position. That is, the retaining member 40 blocks movement of the terminal fitting 10 with respect to the terminal accommodating section 22 in a terminal removal direction opposite to the terminal insertion direction at the mounting completion position, and holds the terminal fitting 10 in the terminal accommodating chamber 20*a*. The retaining member 40 may be provided for each terminal fitting 10, may be provided for a plurality of terminal fittings 10, or may be intended for retaining all the terminal fittings 10. Here, one retaining member 40 is provided for each terminal fitting 10.

The retaining member 40 is held by the terminal accommodating section 22 at the mounting completion position with respect to the terminal accommodating section 22. Therefore, a held section 41A held by the terminal accommodating section 22 is provided in the retaining member 40 (FIGS. 8, 10, and 12 to 15). Furthermore, a locked section (hereinafter, referred to as a "first locked section") 42A that causes the terminal accommodating section 22 to block movement with respect to the terminal accommodating section 22 in the terminal removal direction is provided in the retaining member 40 (FIGS. 8, 10, and 12 to 14). Meanwhile, the terminal accommodating section 22 includes a retainer insertion hole 22*c* through which the retaining member 40 is inserted into the terminal accommodating chamber 20*a* in a retainer insertion direction directed in one alignment direction, and a retainer holding section 22*d* that is arranged to face a held section 41A of the retaining member 40 at the mounting completion position in the retainer removal direction opposite to the retainer insertion direction and blocks movement of the held section 41A in the retainer removal direction (FIGS. 8, 10, and 14 to 16). Further, the terminal accommodating section 22 includes a retainer locking section 22*e* that is arranged to face the first locked section 42A of the retaining member 40 at the mounting completion position in the terminal removal direction and blocks movement of the first locked section 42A of the retaining member 40 in the terminal removal direction (FIGS. 8 and 10).

In the terminal accommodating section 22 illustrated here, the first wall body 22*a* includes the retainer insertion hole 22*c* (FIGS. 8, 10, 14, and 16). The retainer insertion hole 22*c* is a through-hole through which the retaining member 40 is inserted from the first wall body 22*a* side toward the second wall body 22*b* side. Furthermore, in the first wall body 22*a*, a peripheral wall of the retainer insertion hole 22*c* in the terminal removal direction is used as the retainer locking section 22*e* (FIGS. 8 and 10).

Figure 14:
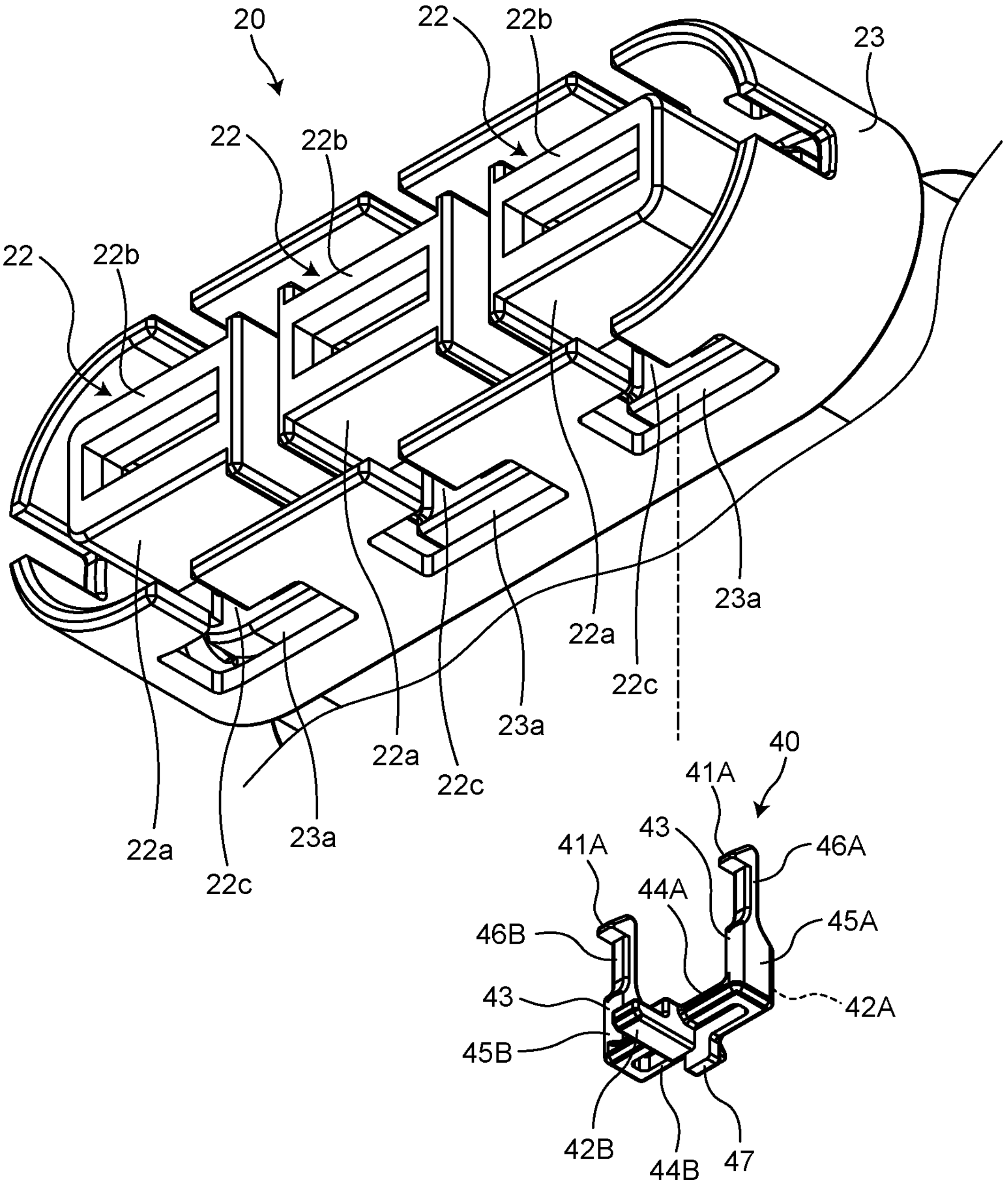
FIG. 14 is an exploded perspective view of a terminal accommodating section and the retaining member.

The retainer insertion hole 22*c* is covered by the hood section 23 from the outside. Therefore, in the housing 20, a through-hole 23*a* is provided at a position facing the retainer insertion hole 22*c* in the hood section 23, and the retaining member 40 is inserted into the retainer insertion hole 22*c* through the through-hole 23*a* (FIGS. 8, 10, and 14).

Figure 15:
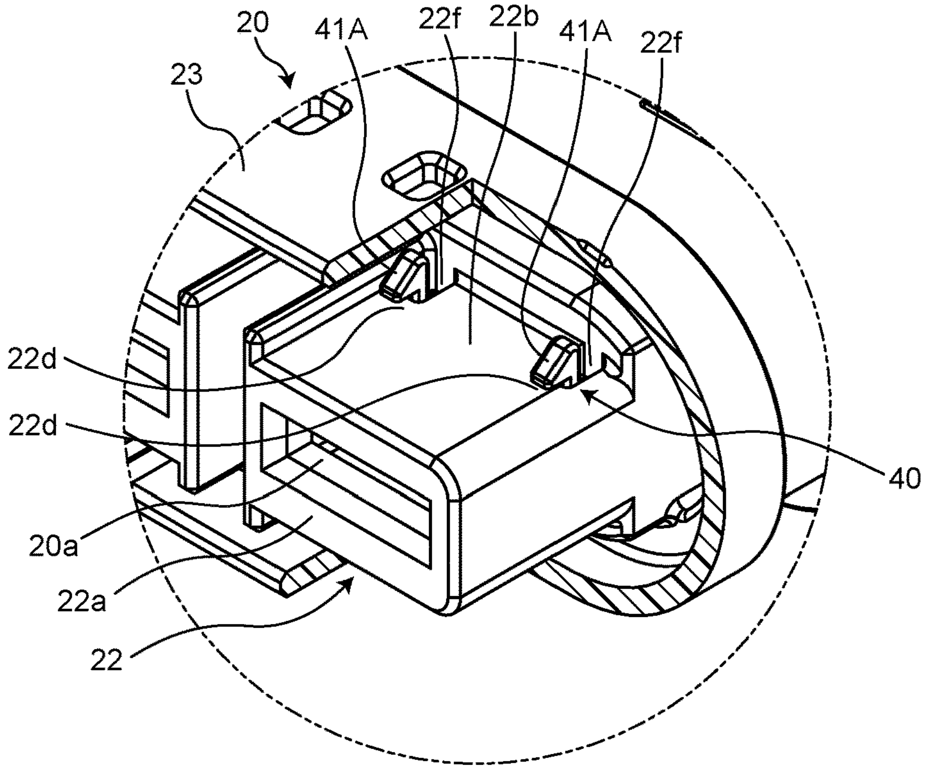
FIG. 15 is a partially cut-away perspective view of the housing, illustrating the terminal accommodating section and the retaining member in an inward locked state.

In the terminal accommodating section 22 illustrated here, the second wall body 22*b* includes a retainer inserting hole 22*f* through which the held section 41A of the retaining member 40 is inserted from the terminal accommodating chamber 20*a* to the outside (FIGS. 8 and 15). The retainer inserting hole 22*f* is a through-hole through which the held section 41A inserted into the terminal accommodating chamber 20*a* through the retainer insertion hole 22*c* is removed from the terminal accommodating chamber 20*a* to the outside in the retainer insertion direction. Furthermore, in the second wall body 22*b*, a peripheral wall of the retainer inserting hole 22*f* is used as the retainer holding section 22*d* (FIGS. 8 and 15). As the retainer holding section 22*d* of the second wall body 22*b* illustrated here, the peripheral wall of the retainer inserting hole 22*f* in the terminal insertion direction in the second wall body 22*b* is used. The held section 41A illustrated here is formed as a protrusion that protrudes in the terminal insertion direction and causes the peripheral wall of the retainer inserting hole 22*f* in the terminal insertion direction to be arranged to face the retaining member 40 in the retainer removal direction when the retaining member 40 is at the mounting completion position (FIG. 8). Here, the held section 41A is formed in a claw shape.

Furthermore, in the connector 1 illustrated here, in addition to a combination of the held section 41A and the retainer holding section 22*d*, another combination of a held section 41B and a retainer holding section 22*g* is provided (FIG. 10). That is, the retaining member 40 includes, separately from the one held section 41A locked to the retainer holding section 22*d* of the second wall body 22*b*, the other held section 41B held by the terminal accommodating section 22. In addition to the one retainer holding section 22*d* provided in the second wall body 22*b*, the terminal accommodating section 22 includes the other retainer holding section 22*g* that is arranged to face the other held section 41B of the retaining member 40 at the mounting completion position in the retainer removal direction and blocks movement of the other held section 41B in the retainer removal direction. The other retainer holding section 22*g* is provided at the first wall body 22*a*. For example, as the other retainer holding section 22*g* of the first wall body 22*a* illustrated here, a peripheral wall of the retainer insertion hole 22*c* in the terminal removal direction in the first wall body 22*a* is used. The other held section 41B illustrated here is formed as a protrusion that protrudes in the terminal removal direction and causes the peripheral wall of the retainer insertion hole 22*c* in the terminal removal direction to be arranged to face the retaining member 40 in the retainer removal direction when the retaining member 40 is at the mounting completion position. Here, the other held section 41B is formed in a claw shape.

Furthermore, in the connector 1 illustrated here, two sets of combinations of the one held sections 41A and the retainer holding sections 22*d* are provided (FIG. 15), and one set of the combination of the other held section 41B and the retainer holding section 22*g* is provided (FIG. 10). The connector 1 illustrated here includes two sets of combinations of the first locked section 42A and the retainer locking section 22*e*. In the connector 1 illustrated here, the retaining member 40 is held by the terminal accommodating section 22 at the mounting completion position with respect to the terminal accommodating section 22 by the two sets of the combinations of the one held sections 41A and the retainer holding sections 22*d*, the one set of the combination of the other held section 41B and the retainer holding section 22*g*, and the two sets of the combinations of the first locked sections 42A and the retainer locking section 22*e*.

The retaining member 40 blocks movement of the terminal fitting 10 with respect to the terminal accommodating section 22 in the terminal removal direction at the mounting completion position with respect to the terminal accommodating section 22, Therefore, the retaining member 40 includes a terminal locking section 43 that is arranged to face the terminal fitting 10 in the terminal removal direction at the mounting completion position with respect to the terminal accommodating section 22 and blocks movement of the terminal fitting 10 in the terminal removal direction (FIGS. 8, 9, and 12 to 14). Meanwhile, the terminal fitting 10 includes a locked section 14 that is arranged to face the terminal locking section 43 of the retaining member 40 at the mounting completion position in the terminal insertion direction and causes the terminal locking section 43 to block movement in the terminal removal direction (FIGS. 8, 9, 12, and 13). Further, the terminal fitting 10 includes a retainer accommodating section 15 that accommodates the terminal locking section 43 of the retaining member 40 at the mounting completion position and can relatively move with respect to the terminal locking section 43 in the alignment direction (FIGS. 8 to 10, 12, and 13).

Figure 12:
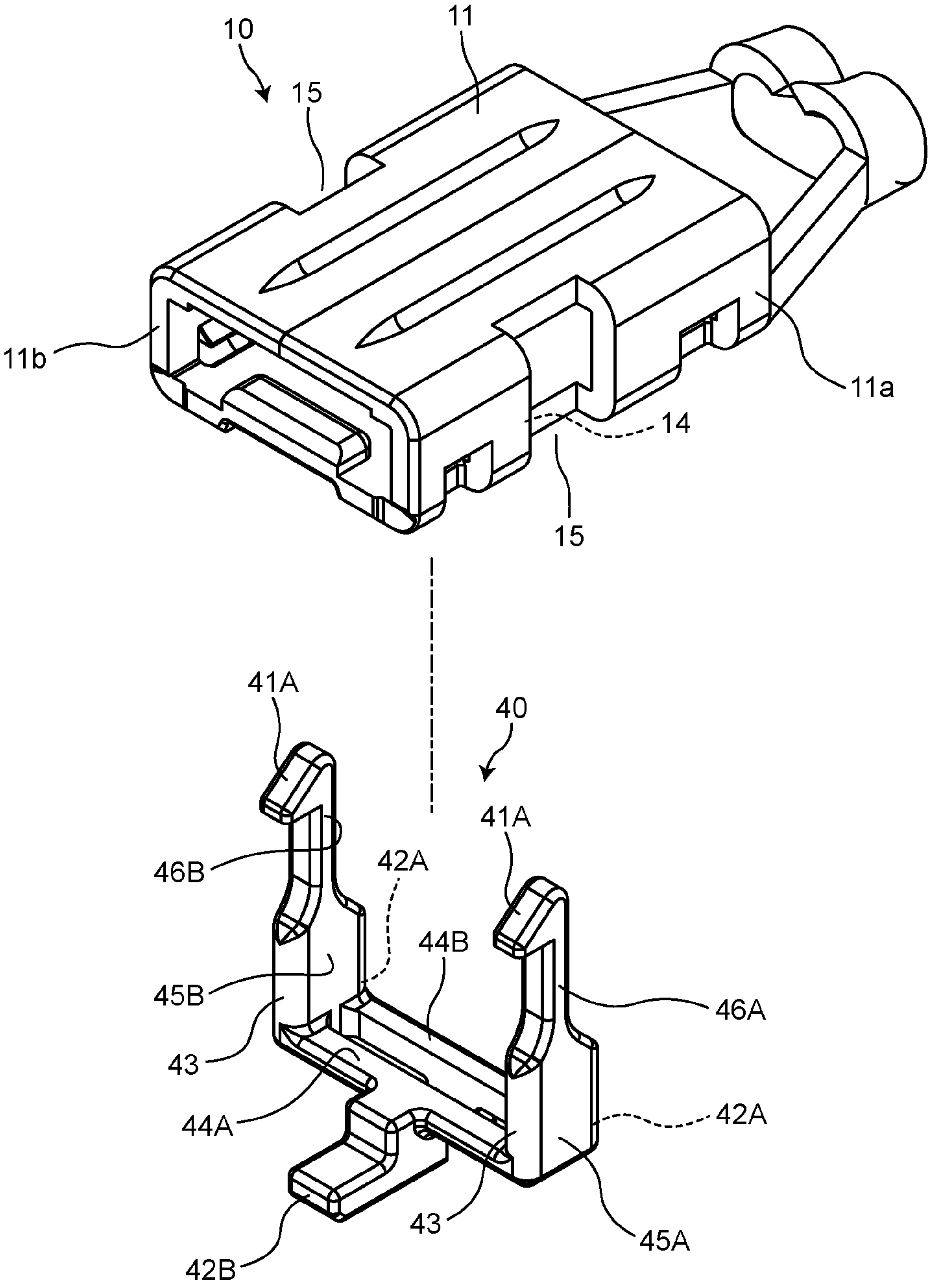
FIG. 12 is an exploded perspective view of a terminal fitting and a retaining member.
Figure 13:
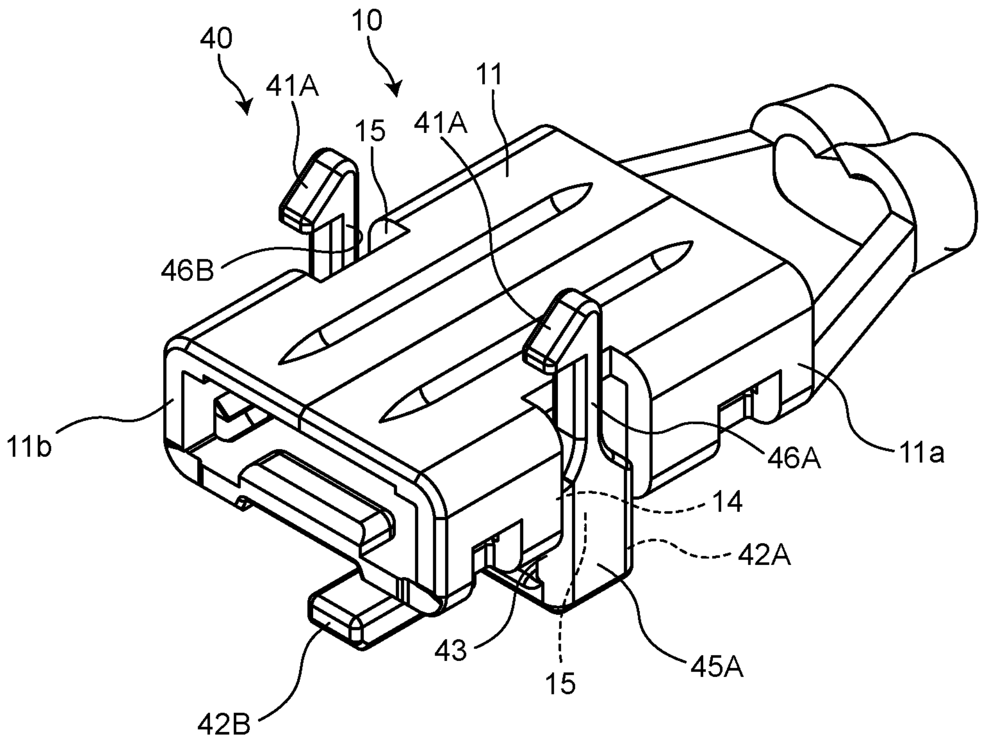
FIG. 13 is a perspective view illustrating the terminal fitting and the retaining member in a locked state.

The retainer accommodating section 15 illustrated here is formed in the side walls 11*a* and 11*b* of the terminal connection section 11 in a direction orthogonal to the terminal insertion direction and the alignment direction by cutting the side walls 11*a* and 11*b* (FIGS. 12 and 13). Each retainer accommodating section 15 is a space in which a part of each of the side walls 11*a* and 11*b* is cut in the alignment direction. Therefore, the retaining member 40 includes the terminal locking section 43 for each retainer accommodating section 15. Each retainer accommodating section 15 causes each retaining member 40 to accommodate the terminal locking section 43 when the retaining member 40 is at the mounting completion position, so that the wall of the terminal accommodating section 22 is present more toward the terminal insertion direction than the terminal locking section 43 is. Therefore, as the locked section 14 of the terminal fitting 10 illustrated here, a peripheral wall of each retainer accommodating section 15 in the terminal insertion direction is used.

Figure 9:
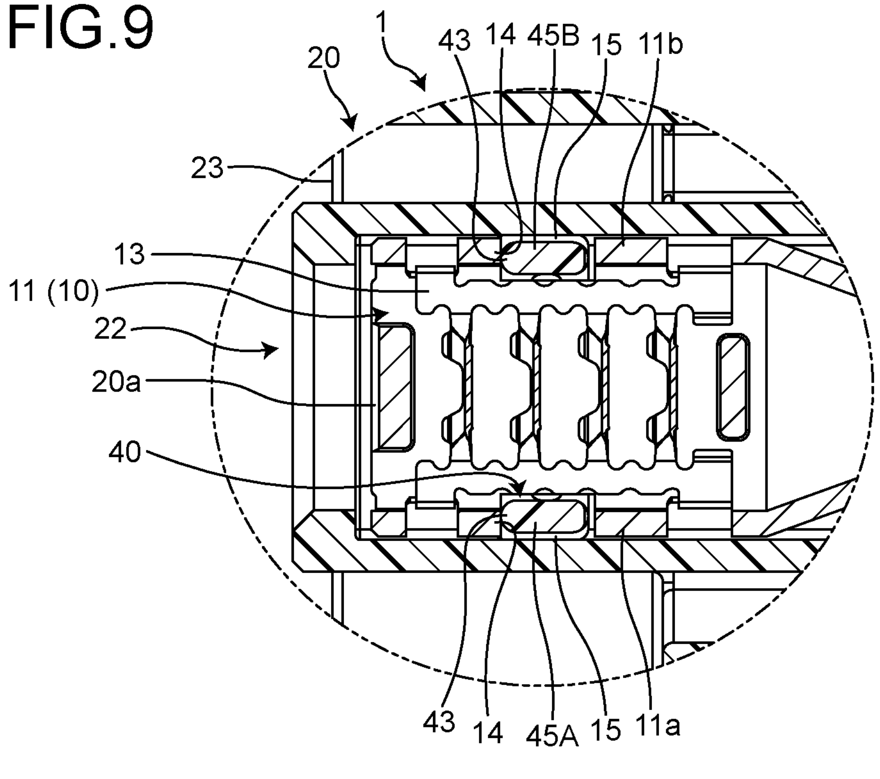
FIG. 9 is a partially enlarged view obtained by rotating a cross section taken along line Y-Y of FIG. 6 by 90 degrees.
Figure 16:
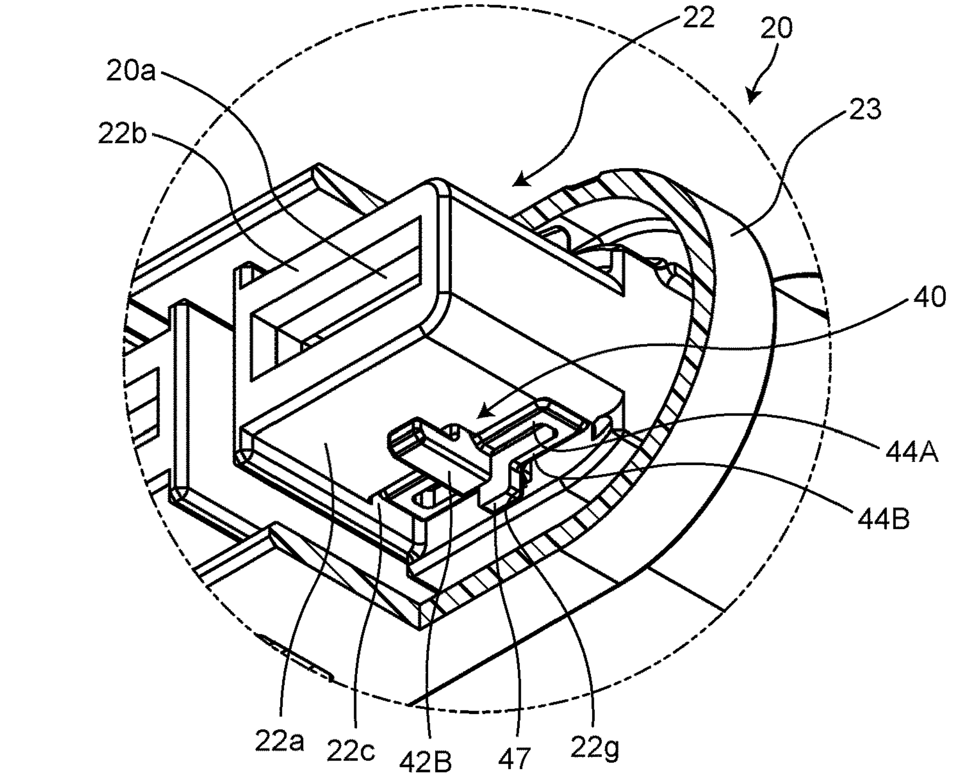
FIG. 16 is a partially cut-away perspective view of the housing, illustrating the terminal accommodating section and the retaining member in an inward locked state when viewed from a different angle.

Specifically, the retaining member 40 illustrated here includes a first shaft section 44A and a second shaft section 44B that are arranged to face each other while being spaced apart from each other in the terminal insertion direction and have a shaft shape extending in a direction orthogonal to the terminal insertion direction and the alignment direction (FIGS. 12, 14, and 16). The retaining member 40 illustrated here includes a piece-like first piece section 45A that connects one end portions of the first shaft section 44A and the second shaft section 44B to each other and extends in the retainer insertion direction from the end portion side, and a piece-like second piece section 45B that connects the other end portions of the first shaft section 44A and the second shaft section 44B to each other and extends in the retainer insertion direction from the end portion side (FIGS. 9, 12, and 14).

Here, the first shaft section 44A is arranged on the terminal insertion direction side, and the second shaft section 44B is arranged on the terminal removal direction side. In the retaining member 40, the second shaft section 44B held by both the first piece section 45A and the second piece section 45B has flexibility and is thus capable of being bent in, for example, the terminal insertion direction and the terminal removal direction. In the retaining member 40, the first shaft section 44A and the second shaft section 44B are arranged in the retainer insertion hole 22c at the mounting completion position with respect to the terminal accommodating section 22. Therefore, the retainer insertion hole 22c is formed in a shape and size in which the first shaft section 44A and the second shaft section 44B can be arranged.

In the retaining member 40, end portions of the first piece section 45A and the second piece section 45B in the terminal insertion direction are used as the terminal locking section 43 (FIGS. 12 and 14). Therefore, in the retaining member 40, at the mounting completion position with respect to the terminal accommodating section 22, the first piece section 45A is accommodated in one retainer accommodating section 15, and the second piece section 45B is accommodated in the other retainer accommodating section 15. Further, in the retaining member 40, end portions of the first piece section 45A and the second piece section 45B in the terminal removal direction are used as the first locked section 42A (FIG. 12).

In addition, the retaining member 40 illustrated here includes a shaft-like cantilevered first flexible section 46A extending from the first piece section 45A in the retainer insertion direction and having flexibility, and a shaft-like second flexible section 46B extending from the second piece section 45B in the retainer insertion direction and having flexibility (FIGS. 12 to 14), The first flexible section 46A and the second flexible section 46B have flexibility and are thus capable of being bent in the terminal insertion direction and the terminal removal direction. The one held section 41A is provided at a free end of each of the first flexible section 46A and the second flexible section 46B.

In addition, the retaining member 40 illustrated here includes a protruding section 47 protruding in the retainer removal direction from the center of the second shaft section 44B in the extending direction (FIGS. 8, 10, 14, and 16). The protruding section 47 illustrated here is formed in a rectangular parallelepiped shape, and the other held section 41B protrudes from a wall surface on the terminal removal direction side (FIG. 10).

In addition, the retaining member 40 illustrated here includes a locked section (hereinafter, referred to as a "second locked section") 42B locked to the terminal accommodating section 22 in such a way as not to be pushed in the retainer insertion direction beyond the mounting completion position with respect to the terminal accommodating section 22 (FIGS. 8, 10, 12 to 14, and 16). The second locked section 42B protrudes in the retainer removal direction and the terminal insertion direction from the center of the first shaft section 44A in the extending direction, and is locked to the second wall body 22b of the terminal accommodating section 22.

As described above, in the connector 1 according to the present embodiment, the position of the axial center P of the fitting wall 21 is aligned with the position of the axial center P of the mating fitting space 500b at the fitting completion position by at least three sets or more of the combinations of the abutted sections 25 and the abutting sections 500di, and the positional deviation of the housing 20 with respect to the inner peripheral surface 500b1 of the mating fitting space 500b can be suppressed at the fitting completion position, Therefore, the connector 1 can appropriately align the terminal fitting 10. For example, in the connector 1 according to the present embodiment, the terminal fitting 10 is held by the housing 20 in a state where the terminal fitting 10 is relatively movable in the alignment direction by the retaining member 40, but the function of aligning the terminal fitting 10 in the alignment direction can be effectively executed due to the effect of suppressing the positional deviation of the housing 20 with respect to the inner peripheral surface 500bi of the mating fitting space 500b. Therefore, in the connector 1, the terminal fitting 10 can obtain an appropriate contact pressure between the terminal fitting 10 and the mating terminal fitting 510. Therefore, in the connector 1, a quality in electrical connection between the terminal fitting 10 and the mating terminal fitting 510 becomes high, and occurrence of an overload between a component with a mating component thereof can be suppressed.

In the connector according to the embodiment, the position of the axial center of the fitting wall is aligned with the position of the axial center of the mating fitting space at the fitting completion position by at least three sets or more of the combinations of the abutted sections and the abutting sections, and the positional deviation of the housing with respect to the inner peripheral surface of the mating fitting space can be suppressed at the fitting completion position. Therefore, the connector can appropriately align the terminal fitting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting that is physically and electrically connected to a mating terminal fitting arranged in a mating fitting space;

a housing that includes a fitting wall fitted into the mating fitting space through an insertion port in a housing insertion direction, and a terminal accommodating section that accommodates the terminal fitting in a terminal accommodating chamber in the terminal accommodating section and is inserted into the mating fitting space together with the fitting wall; and an annular or tubular elastically deformable sealing member that fills an annular or tubular gap between an outer peripheral surface of the fitting wall and an inner peripheral surface of the mating fitting space in a circumferential direction at a fitting completion position of the fitting wall and the mating fitting space where positions of axial centers of the fitting wall and the mating fitting space are aligned with each other; and a retaining member that is held by the terminal accommodating section at a mounting completion position with respect to the terminal accommodating section and holds, in the terminal accommodating chamber, the terminal fitting inserted into the terminal accommodating chamber in a terminal insertion direction that is the same as the housing insertion direction, the retaining member blocks movement of the terminal fitting with respect to the terminal accommodating section in a terminal removal direction opposite to the terminal insertion direction at the mounting completion position, wherein the housing includes a plurality of abutted sections that abut on an abutting section on an inner peripheral surface side of the mating fitting space at the fitting completion position, each of the abutted sections are provided at a respective one of at least three locations that are spaced away from each other, each of the abutted sections together with the abutting section that forms a pair with the abutted section, and is formed in such a way that a distance from the axial center of the fitting wall to a contact position between each of the abutted sections and the abutting section is the same as a distance from the axial center of the mating fitting space to the contact position, and the abutted section abuts on the abutting section provided on an annular tapered surface at a peripheral edge of the insertion port of the mating fitting space at the fitting completion position.

2. The connector according to claim 1, wherein the abutted section protrudes higher than the outer peripheral surface of the fitting wall.

3. The connector according to claim 1, wherein the mating fitting space is an oval through-hole, the fitting wall is formed to have the outer peripheral surface having an oval shape similar to that of the mating fitting space, the sealing member is formed in an oval annular shape or an oval cylindrical shape similar to that of the mating fitting space.

4. The connector according to claim 2, wherein the mating fitting space is an oval through-hole, the fitting wall is formed to have the outer peripheral surface having an oval shape similar to that of the mating fitting space, the sealing member is formed in an oval annular shape or an oval cylindrical shape similar to that of the mating fitting space.

5. The connector according to claim 1, wherein the terminal accommodating chamber is formed in an indoor space in which the terminal fitting is relatively movable in an alignment direction orthogonal to the terminal insertion direction, the retaining member includes a terminal locking section that is arranged to face a locked section of the terminal fitting in a terminal removal direction side at the mounting completion position and blocks movement of the locked section in the terminal removal direction, and the terminal fitting includes a retainer accommodating section that accommodates the terminal locking section of the retaining member at the mounting completion position and is configured to relatively move with respect to the terminal locking section in the alignment direction.

6. The connector according to claim 2, wherein the terminal accommodating chamber is formed in an indoor space in which the terminal fitting is relatively movable in an alignment direction orthogonal to the terminal insertion direction, the retaining member includes a terminal locking section that is arranged to face a locked section of the terminal fitting in a terminal removal direction side at the mounting completion position and blocks movement of the locked section in the terminal removal direction, and the terminal fitting includes a retainer accommodating section that accommodates the terminal locking section of the retaining member at the mounting completion position and is configured to relatively move with respect to the terminal locking section in the alignment direction.

7. The connector according to claim 3, wherein the terminal accommodating chamber is formed in an indoor space in which the terminal fitting is relatively movable in an alignment direction orthogonal to the terminal insertion direction, the retaining member includes a terminal locking section that is arranged to face a locked section of the terminal fitting in a terminal removal direction side at the mounting completion position and blocks movement of the locked section in the terminal removal direction, and the terminal fitting includes a retainer accommodating section that accommodates the terminal locking section of the retaining member at the mounting completion position and is configured to relatively move with respect to the terminal locking section in the alignment direction.

* * * * *